June 4, 1968 R. R. MARRIAM 3,386,660
SLURRY FERTILIZER SPRAY APPARATUS
Filed Sept. 27, 1965 4 Sheets-Sheet 2

ROBERT R. MARRIAM - INVENTOR

BY Edward J. Hanson Jr.
ATTORNEY

INVENTOR
ROBERT R. MARRIAM

BY Edward J. Hanson
ATTORNEY

June 4, 1968          R. R. MARRIAM          3,386,660

SLURRY FERTILIZER SPRAY APPARATUS

Filed Sept. 27, 1965          4 Sheets-Sheet 4

ROBERT R. MARRIAM — INVENTOR

BY Edward J. Hanson Jr.

ATTORNEY united States Patent Office 3,386,660
Patented June 4, 1968

3,386,660
SLURRY FERTILIZER SPRAY APPARATUS
Robert R. Marriam, Decatur, Ill., assignor to W. R. Grace & Co., New York, N.Y., a corporation of Connecticut
Filed Sept. 27, 1965, Ser. No. 490,191
9 Claims. (Cl. 239—142)

ABSTRACT OF THE DISCLOSURE

This invention is directed to a slurry fertilizer spray applicator and in one of its aspects to the unitary construction of said applicator mounted upon skid means, in another aspect to special power means for dispensing slurry, and still another aspect to a sparger line within the slurry tank adapted to circulate the slurry in the slurry tank, and in another aspect to a nozzle, boom and interconnecting line arrangement enabling wide utility with simple construction, all as further described hereinafter.

The present invention relates to the application of fertilizers to crop land, and is particularly applicable to apparatus for quickly and precisely distributing slurry fertilizers over a wide area and to a technique for utilizing such apparatus.

Fertilizers that are prepared by acidulating phosphate rock and substantially neutralizing the acidulate with ammonia have recently been spread directly on the soil as slurries rather than being further processed to a dry form before spreading. These slurry fertilizers have a wide variety of chemical and physical properties depending upon their particular formulations and additives. Such slurry fertilizers tend to contain some coarse sand as an impurity and thus tend to erode surfaces over which they flow, they have a high solids content and, therefore, tend to form sludge and scale in storage and plumbing facilities in which they are handled, and they have pH's that vary from acid to somewhat alkaline.

In order to apply the slurry fertilizer directly to the soil it is often necessary to enter rough and furrowed fields. Crops must be fertilized at particular times to obtain desired results and so the periods during which most fertilizers must be applied in a particular region are short periods. The amount of spreading time during the allowable dates can be substantially increased by spreading fertilizer at night as well as during the day.

It is an object of the present invention to provide a unitary, vehicular mounted slurry spray applicator that may be suitably mounted on a wide variety of conveying vehicles and that will be reliable and economical to operate.

It is another object of this invention to provide a slurry spray applicator that is not only inexpensive to maintain but also inexpensive to manufacture.

An additional object of the present invention is to provide an improved slurry fertilizer applicator that is resistant to clogging, erosion and vibratory and impact damage.

Another object of this invention is to provide a versatile slurry fertilizer applicator that can operate effectively during the day and at night with precision, providing close control of the application of the fertilizer.

It is a still further object of this invention to provide a technique for applying slurry fertilizers at night.

In summary, in a preferred embodiment of one aspect of this invention, a unitary slurry spray applicator is mounted on two skids so that it can be mounted upon any one of a number of different types of vehicles. The applicator has a slurry tank with an internal sparger line for stirring the slurry in the tank. A pumping section is connected to the sump in the slurry tank by a supply conduit that has a flexible hose section. A delivery conduit that has a flexible hose section connects the outlet of the pump to the applicators distributing section and a sparger line conduit with a flexible hose section connects the sparger line to the delivery conduit. To reduce erosion the elbow turns are hose sections or T connections. The T connections are so positioned that the slurry will flow toward a sealed off channel and build its own elbow turn by depositing solids in the sealed off channel. The applicator has a control section that includes a valve in the sparger conduit for adjusting the ratio of slurry distributed to the sparger line and the distributing section. Another valve in the delivery conduit cuts the flow of slurry to the distribution section off and on. The applicator has a built-in flushing system that is connected to the pump so that the entire applicator plumbing system and the bottom of the slurry tank can be flushed out immediately after a fertilizer spreading run.

In another of its aspects in a preferred form, the invention is directed to a nozzle arrangement that provides a choice of operating the applicator with only one central spreading nozzle, with two boom spreading nozzles or with two boom spreading nozzles and a central spreading nozzle. These three choices can be made even though no valves are provided in the distributing section of the applicator.

Another aspect of the invention, in a preferred form, is the provision of an alternate arrangement for driving the pump. The pump may be powered by a hydraulic motor system connected into the power plant of the vehicle upon which the spray apparatus is mounted or by an integrally contained gasoline engine in no way dependent upon the conveying vehicle for power.

In an additional aspect of this invention, in a preferred form, the applicator is equipped for night operation and a technique is provided for applying the slurry at night. By this technique an initial path is layed out using a lime mark and the applicator is guided by this lime mark on its first spreading pass through the field. After the first pass through the field the applicator is guided by the spots of slurry in the swaths already spread. The swaths are laid in sequence side by side until the field has been covered. The lights on the applicator and its vehicle aid in following the route through the field. Periodically, the covered area of the field is inspected for skips in coverage. Illumination is not necessary for this inspection when the fertilizer slurries are of the usual type that have a slight natural luminous characteristic when freshly spread.

Further aspects of the present invention will become apparent hereinafter and the specification concludes with claims particularly pointing out and distinctly claiming the subject matter which I regard as my invention. The invention, however, as to organization and method of operation, together with other objects and advantages thereof, may best be understood by reference to the following description when taken in conjunction with the accompanying drawing, in which:

Figure 1:
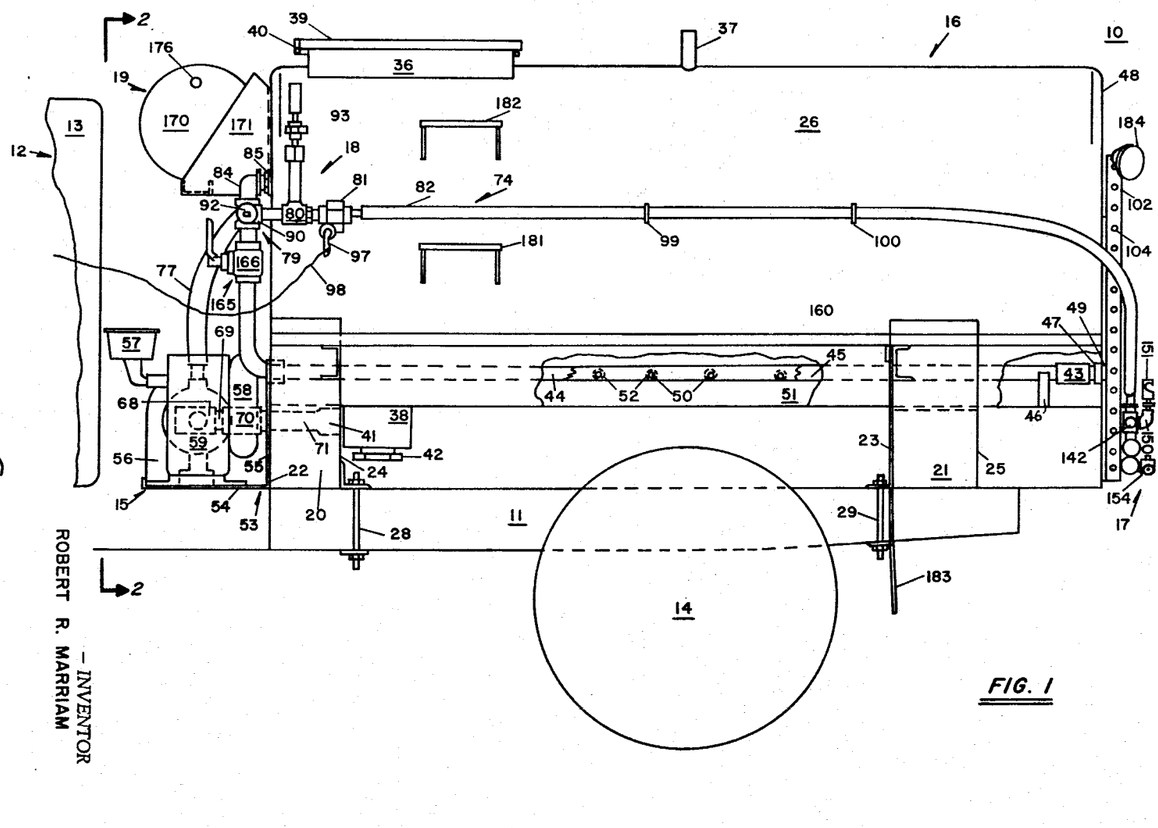
FIGURE 1 represents a side view of one preferred embodiment of the present invention with parts broken away.

Referring to FIGURE 1, a unitary, vehicular mounted slurry spray applicator 10 is shown mounted on the frame 11 of a truck 12. The truck's cab 13 is shown in partial view and a truck tire 14 is shown in outline. The unitary slurry spray applicator 10 has a pumping section 15, a storage section 16, a distributing section 17, a control section 18, and a flush-out section 19.

The unitary slurry spray applicator 10 has two mounting skids 20 and 21. The skids are formed from sheet steel and are hollow internally having substantially planar front walls 22 and 23 and rear walls 24 and 25 respectively. The bottom of each skid is a solid wall of sheet steel and the top of each skid is open with the upper edges of the front and rear walls 22, 23, 24, and 25 being curved to match with and serve as a saddle for receiving the lower surface of the slurry storage tank 26 of the slurry storage section 16. The slurry storage tank 26 has 1,073 gal. capacity and it is welded to the skids closing them.

The unitary vehicular mounted slurry spray applicator 10 is a universal applicator. It is mounted on skids so that it can be mounted on vehicles of various types. The applicator 10 is shown in FIGURE 1 mounted on a truck frame 11. However, the applicator can be mounted on a flat-bed truck, an ammonia wagon, a trailer or some other vehicle.

Two pairs of frame clamps, a front pair 27 and 28 and a rear pair 29 and 30 (see FIGURES 2 and 5) clamp the applicator 10 to the truck frame 11. The slurry spray applicator 10 is slipped across the truck frame with the skids 20 and 21 resting on the frame members of the truck, and the bolts are secured to clamp the frame members and hold the applicator 10 in position. If the bolts 31 and 32 (referring to FIGURE 2) and the bottom portion 33 of the clamps are removed the upper clamp sections 34 do not extend below the lower surface of the skids and the skids may be placed on a continuous flat surface and the entire unit strapped down in any manner, such as by looping chains around the body of tank 26. The unit may be installed on a flat-bed truck in this manner.

Besides the storage tank 26 the storage section 16 has a sparger line 44 for agitating or stirring the slurry in the slurry tank 26, a manhole 36 for loading the slurry into the tank 26, a vent pipe 37 for venting the tank to the outside atmosphere and a sump 38 to enable the complete evacuation of the tank 26. The manhole 36 has a hinged cover 39 and a latch 40. The cover has a gasket around it (not shown) to prevent the slurry in the tank 26 from sloshing out during transport over a rough surface. The manhole 36 is large enough to permit a man to enter the tank 26 to clean the tank or make repairs when necessary. The sump 38 has an outlet 41 and a drain 42. The outlet 41 is above the bottom of the sump which permits very heavy sediment to fall below the outlet rather than flowing into the outlet and the conduits beyond where it could interfere with the proper operation of the applicator. This heavy sediment or sludge can be removed through the drain 42.

A flexible hose connection 43 which provides a limited amount of movement and resiliency is provided at the outer end of the sparger line 44 to prevent vibration from breaking or bending the sparger tube 45. A sparger support 46, inside of the tank 26 supports the outer end of the sparger tube 45 which is a 1½ inch carbon steel or stainless steel or rubber pipe 9′7″ long. The outer end of the sparger line 44 extends through a full coupling fitting 47 in the rear wall 48 of the tank 26 so that ready access can be had to the interior of the sparger line 44 through plug 49. When the plug 49 is removed the sparger line can be readily flushed with high volumes of water or a stiff rod can be run into the line to break out deposits of sediment.

The sparger holes 50 in the sparger tube 45 are arranged in a continuous straight line along the length of the sparger tube. The holes 50 are fifteen inches on center and 7/16 of an inch in diameter. They are positioned so that their streams sweep down and across the bottom 51 of the tank 26. The curvature of the tank 26 bends the sparger streams upwardly and a circular movement of the slurry is set up in the tank 26. The size of the sparger holes is critical from several standpoints. The number and spacing of the holes must be carefully matched to the flow capacity and discharge pressure of the pump so that sufficient agitating effect will be provided by the sparger tube to keep the slurry in a homogeneous mixed condition. The holes cannot be much larger than 7/16 of an inch in diameter because the flow through the holes goes up with the square of the diameter. If the holes are much smaller than 7/16 of an inch they may be plugged by the relatively large suspended particles of a fertilizer slurry. In order to prevent wear of the holes 50 a hard protective surface that will be resistant to erosion is provided around each hole. This has been done by laying a stellite bead 52 around each sparger hole.

The pumping section 15 of the unitary slurry spray applicator 10 has a stand portion 53 with a mounting platform section 54 and an attachment section 55. The attachment section 55 is welded to the front panel 22 of the skid 20.

Figure 2:
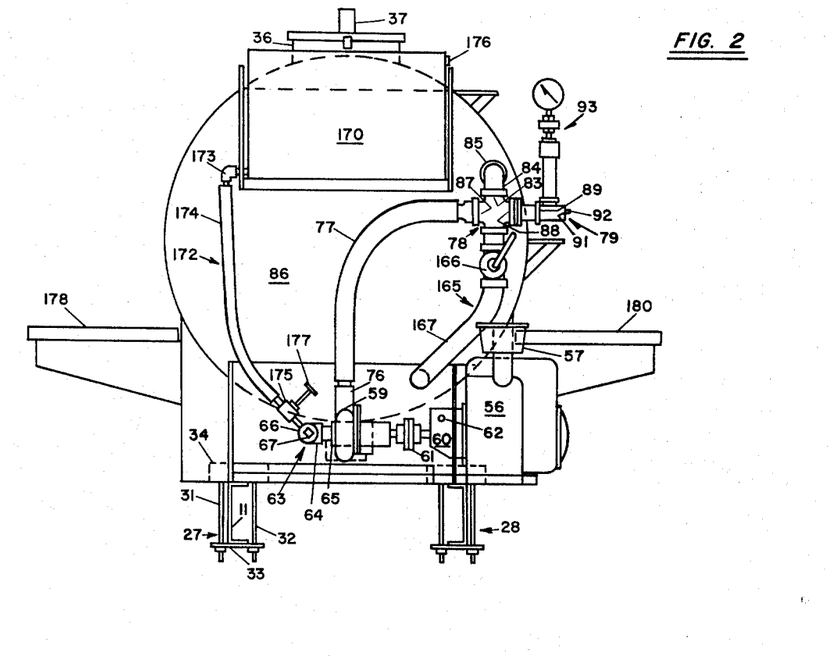
FIGURE 2 represents a view taken along line 2—2 of FIGURE 1.

The pumping section 15 has a 12½ horse power gasoline engine 56 shown in solid lines in FIGURE 1 and FIGURE 2. The gasoline engine 56 has an oil bath air filter 57 and a gas tank 58. The gasoline engine 56 drives a reversible centrifugal pump 59, shown in broken lines in FIGURE 1, through a clutch 60 and a flexible coupling member 61, as shown in FIGURE 2. The clutch has an operating lever 62. The pump's capacity is 160 gal. per minute at a 40 foot head. The pumping section is mounted at the forward end of the applicator 10 so that less dirt, dust and drifting spray will foul the engine. The oil bath air filter also assists in protecting the engine from dirt, dust and drifting spray.

A 2½ inch carbon steel T 63 has its branch channel 64 connected to the inlet 65 of the pump 59. One of the run channels 66 of the T 63 has a flush out plug 67 and the other run channel 68 has a hose receiving adapter 69 connected therein. A short piece of 2½ inch hose 70 is engaged at one end on adapter 69 and at its other end on 2 inch pipe 71 which extends through skid 20 and is engaged with the sump outlet 41, to form a supply conduit from the sump 38 to the pump 59.

Figure 3:
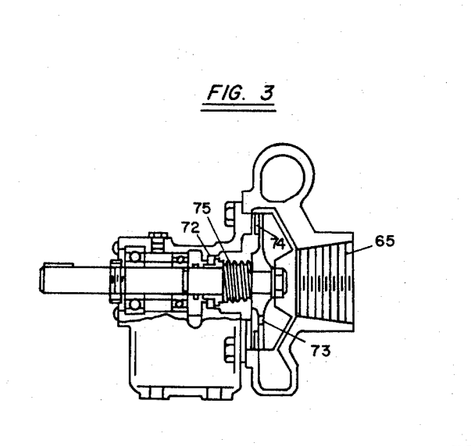
FIGURE 3 represents an enlarged view of the centrifugal pump 59 of FIGURE 2 with parts broken away.

The pump 59 is a straight, reversible centrifugal pump, of the type shown in FIGURE 3, with a mechanical seal 72, pump holes 73 and back vanes 73a. The mechanical seal has a tensioning spring 75 that keeps the seal fluid tight. A pump used to pump fertilizer slurries that have a considerable quantity of coarse material suspended in them needs a seal that will not fail when the coarse material comes into contact with it. A tensioned mechanical seal has been found to have these characteristics. However, if the slurry fertilizer can build up and cake around the tensioning means, the tensioning means may take a set and become inoperative. It is, therefore, necessary to protect the tensioning means from a build up of fertilizer materials. It has been found that if the pump has pump holes and back vanes so that the slurry can be circulated around the tensioning arrangement, accumulating materials will be flushed away and caking will not occur. If the mechanical seal takes a set for only a short period of time it has been found that the seal fails almost immediately because of the coarse suspended particles in the slurry fertilizers. A reversible centrifugal pump has been chosen because it has been found to wear longer in slurry applications than directional centrifugal pumps.

Looking once again at FIGURES 1 and 2, a delivery conduit 74 may be seen extending from the pump outlet 76 through hose 77, cross 78, T 79, gage connection 80, the ratchet valve 81, and hose 82 to the distributing section 17 of the applicator 10.

The two inch hose 77 is connected at one end to the pump outlet 76 and at its other end to the cross 78 as shown in FIGURE 2. The cross 78 is an ordinary two inch steel plumbing cross and it is connected by an upwardly extending channel 83 to an elbow 84 which is connected to a blind support socket 85 welded onto the front 86 of the slurry tank 26. The delivery conduit 74 includes channels 87 and 88 of the cross 78 and channel 89 of the run of T 79 and the branch channel 90 of the T. The T is a one and one-half inch carbon steel pipe fitting. Channel 91 of the T 79 is a blind channel having a plug 92 therein. It has been found that because of the nature of the slurry fertilizers used in the applicator 10, the slurry will build up in the dead-end channel and form its own elbow when it flows toward a plugged off channel. This has been found to substantially lengthen the useful life of conduits containing elbow turns.

Figure 4:
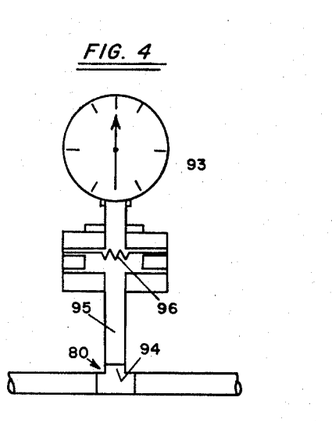
FIGURE 4 represents an enlarged diagrammatic view of the gage 93 of FIGURE 2 with parts broken away.

The gage connection 80 is a T connection with the Bourdon tube gage 93 connected to the branch 94 of the T. The gage 93 may be seen in enlarged view in FIGURE 4. A 1½ inch carbon steel pipe 95 extends from the T to a stainless steel chemical diaphragm 96. The pipe 95 forms an air chamber so that the fluid slurry transfers its pressure to the diaphragm through air pressure rather than directly. Even so some of the slurry and its products have been found to come into contact with and affect the diaphragm 96 and that is why the diaphragm should be a stainless chemical diaphragm. The Bourdon tube should be filled with an oil that is stable at high temperature, such as silicone oil. This is because the slurry fertilizer may be taken directly from the reactor in which it is prepared and may be hotter than 180° F. Normal oils are not stable at this high temperature and cause faulty readings. The gage reads pressures from 0 to 60 pounds per square inch.

Ratchet valve 81 is an on-off type valve. The ratchet valve's handle 97 has a flexible slurry resistant lanyard 98 attached to it. The lanyard may be extended to the window of the truck cab 13 so that the operator of the vehicle can operate the valve 81 to start and stop the flow of slurry to the distributing section 17 while the vehicle is in motion. The ratchet valve 81 is spring loaded and when it is in the off position a pull of the lanyard will open the valve. The spring will return the valve handle to its operable position and the next pull on the lanyard will close the valve with the spring returning the valve handle to its operable position so that the next pull will open the valve again.

The hose 82 extends along the side of the tank 26 connecting the valve 81 to the spray distributing section 17. The hose 82 is supported along the side of the tank 26 by two hose hooks 99 and 100. Rubber hose is preferable to steel pipe because rubber hose is more resistant to abrasion.

Figure 5:
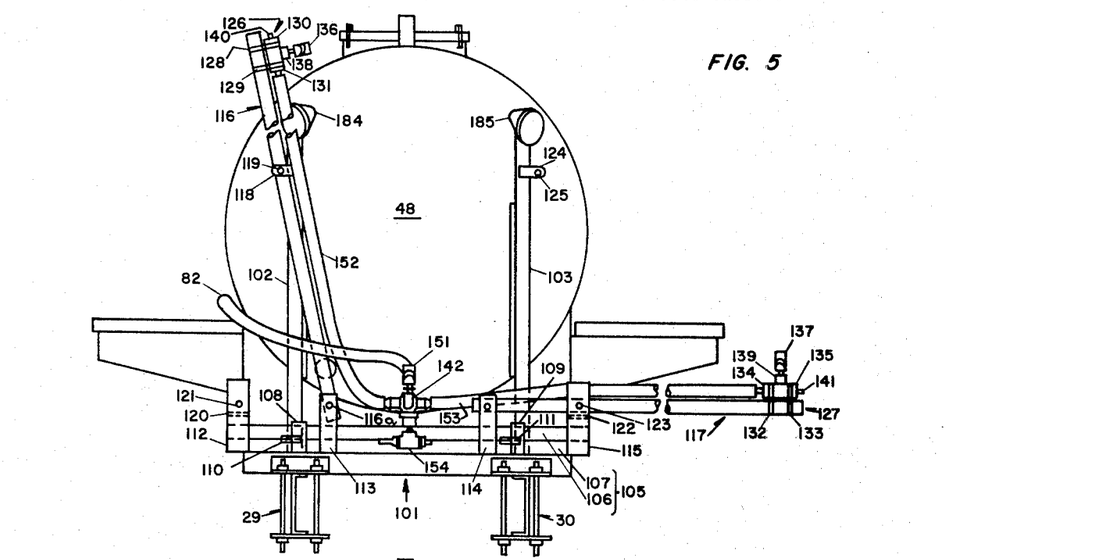
FIGURE 5 represents an end view looking toward the rear of the apparatus shown in FIGURE 1.

Referring to FIGURE 5, it may be seen that the spray section 17 has a nozzle mounting unit 101 supported by two angle iron supports or mounting members 102 and 103 which extend perpendicularly up the back end 48 of the slurry tank 26. The angle iron supports 102 and 103 are welded in place. Referring to FIGURE 1, a plurality of attachment holes or position means 104 may be seen formed in the supports 102 and 103. The mounting unit 101 has a central portion 105 which includes two horizontally extending 1½ inch steel pipes 106 and 107 and two angle iron pieces 108 and 109 that are welded to the pipes. Each of the angle iron pieces 108 and 109 has a hole through it that can be aligned with a hole 104 in a respective one of the supports 102 and 103 so that bolts 110 and 111 can be passed through the aligned holes to secure the mounting unit 101 in position. The mounting unit 101 may be adjusted to various heights by aligning it with the particular set of holes 104 that correspond to the height at which it is desired to mount the unit 101.

Four pairs of upright members 112 and 113, 114 and 115 are welded to the central portion 105 of the mounting unit 101. Two booms 116 and 117 are mounted on the central portion 105. The left hand boom 116 may be seen in the transporting position, pivotally mounted on a pin 116A passing through the pair of upright members 113. The boom 116 is secured to the retaining member 118 by the pin 119. The retaining member 118 is removably bolted to the support member 102. In the travel position the upright boom extends about eighteen inches above the upper extremity of the rear edge of the tank 26. The particular boom presently in use is seven feet long. When the boom 116 is in its operative position it rests on a seat 120 between the pair of upright members 112 and a pin 121 holds it in place.

The right hand boom 117 is seen in the operative spreading position, secured on the seat 122 between the pair of upright members 115 with a pin 123 securing it in the horizontal spreading position. A retaining member 124 is removably bolted to the support member 103 and a pin 125 is provided for securing the boom 117 in the travel position. Both booms extend downwardly at a very slight angle toward their outer ends when they are in their operative positions. Thus they are a little nearer to the ground at their outer extremities. This reduces wind effect.

A nozzle mounting member is provided at the outer end of each boom as shown in FIGURE 5. The nozzles mounting members are ordinary plumbing T's 126 and 127. T 126 is held in position by hose clamps 128 and 129 which extend over the run channels 130 and 131 of the T. T 127 is held in position by hose clamps 132 and 133 which extend over the run channels 134 and 135 of the T. The nozzles 136 and 137 are secured in the branch channels 138 and 139 of the T's 126 and 127 respectively. To adjust the aim or cant of either nozzle 136 or 137 with respect to the ground the mounting member can be rotated slightly under its hose clamps.

A plug 140 closes run channel 130 of T 126 and a plug 141 closes run channel 135 of T 127. By using T's 126 and 127 rather than elbows for the elbow turns the erosion damage to the connection is reduced. As previously mentioned it has been found that because of the nature of the slurry fertilizers used in the applicator 10, the slurry will build up in the dead-end channel and form its own elbow when it flows toward a plugged off channel. This has been found to substantially lengthen the useful life of connections having elbow turns.

Figure 8:
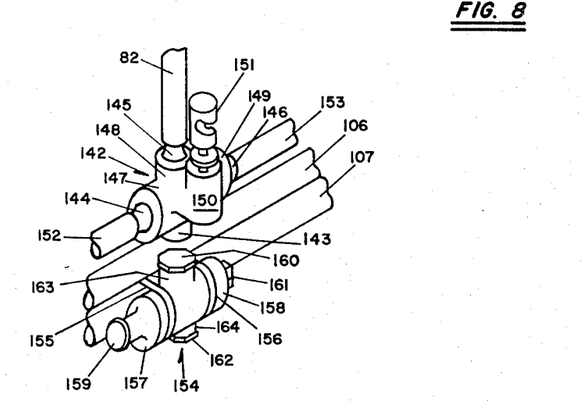
FIGURE 8 represents an isometric fragmentary view of portion of the nozzle mounting unit of FIGURE 5.

Looking now in particular at FIGURE 8, as well as at FIGURES 1 and 5, a cross connection 142 may be seen mounted on top of pipe 106 with its lower channel 143 sealed off and welded to the pipe 106. King nipples 144, 145 and 146 are connected in the other channels 147, 148 and 149 of the cross. A one inch steel elbow 150 is tapped into the outer face of the cross member 142. The elbow 150 opens upwardly and a nozzle 151 is connected through the elbow to the cross 142.

A hose 152 is engaged at one end of king nipple 144 and at its other end with the run channel 131 of the nozzle mounting member 126 connecting the nozzle 136 with the cross 142. A hose 153 is engaged at one end on king nipple 146 and at its other end with the run channel 135 of the nozzle mounting member 127 connecting the nozzle 137 with the cross 142. When the delivery conduit hose 82 is engaged on king nipple 145 it will be understood that slurry flowing through the conduit will be distributed to all three nozzles, 136, 137 and 151.

The nozzles 136, 137 and 151 are stainless steel one piece nozzles that are free of internal obstructions. They are low impact, non-atomizing spray nozzles and they have very wide flat spray patterns with uniform distribution and spray angles varying between 130° and 140° depending on the delivery pressure.

A separate single nozzle mounting means 154 is also attached to the nozzle mounting unit 101. The separate mounting means 154 is a one inch cross which is strapped or clamped to pipe 107. Straps 155 and 156 extend over channels 157 and 158 of the cross 154. A king nipple 159 is secured in channel 157 and plugs 160, 161 and 162 are secured in channels 163, 158 and 164 respectively.

When it is desired to operate the applicator with only one spreading nozzle the centrally mounted nozzle 151 is switched with the plug 160 and the delivery conduit 82 is disengaged from king nipple 145 and engaged on king nipple 159. If it is subsequently desired to use the two boom nozzles 136 and 137 by themselves as spreading nozzles, it is only necessary to move the delivery conduit 82 back to king nipple 145 while the plug 160 remains secured in the upwardly opening channel of elbow 150.

Looking once again at FIGURES 1 and 2, a two inch sparger conduit 165 can be seen to connect the cross 78 of the delivery conduit to the sparger line 44. A valve 166 is positioned in the sparger conduit 165 and supported by the cross 78. A valve 166 controls the ratio of the quantity of slurry pumped by the centrifugal pump 59 between the spray section 17 and the sparger line 44. The centrifugal pump 58 is operated at a single speed and continuously pumps slurry at its rated capacity. The pressure at the gage 93 is regulated by manipulation of valve 166. This controls the quantity of slurry supplied to the nozzles through the hose 82.

The valve 166 has continuous incremental adjustment between its wholly open position and its fully closed position so that any ratio can be obtained between these two extremes. A hose section 167 is provided in the sparger conduit 165 to reduce the likelihood of the conduits being damaged by extreme vibrations. The gage 93, the ratchet valve 81 and the valve 166 function as the regulatory section 18 of the application 10.

It is necessary to have an arrangement for immediate flushing out the slurry after the applicator has completed the spreading of a load of slurry. The slurry cannot be allowed to stand in the plumbing system of the applicator for very long in a quiescent state because of its heavy solids content and its characteristics of caking or building up deposits in the plumbing system. Therefore, a flushing system 19 has been provided. Looking at FIGURE 2 the flushing system may be seen to include 30 gallon water tank or barrel 170 which is mounted on a barrel rack 171. The rack 171 is welded to the front face 86 of the tank 26. A flushing conduit 172 connects the tank 170 to the pump inlet 65. The flushing conduit 172 includes a one inch steel elbow 173, a one inch hose 174, and a valve 175. The conduit 172 connects to the pump inlet 65 through the T 63. The water tank 170 is filled through inlet 176 which has a removable plug. Just as soon as the slurry has been evacuated from the slurry tank 26 the valve handle 177 can be turned to permit the water in the water tank to flow directly into the pump inlet 65 through the T 63. The pump 59 will then pump the water throughout the slurry flow system in the same manner as it pumped the slurry throughout the system thus flushing out the system, including the bottom of the slurry tank 26.

To aid in working with the slurry applicator, two catwalks 178 and 180 have been provided. Two steps 181 and 182 enable a man to climb up the side of the slurry tank 26 from the catwalk 180 to the manhole 36. A mud guard 183 may be seen in FIGURE 1 attached to the rear skid 21.

For night operation the applicator 10 has been provided with two floodlights 184 and 185, see FIGURE 5. Floodlight 184 is removably bolted to the top of support 102 and floodlight 185 is removably bolted to tthe top of support 103. The floodlights 184 and 185 illuminate the area behind the applicator as the slurry is spread. This gives the applicator a capability for effective night operation. The transporting vehicle usually has front lights so that the path in front of the applicator is illuminated. In the present preferred embodiment the floodlights are connected to tthe truck's electrical system in any conventional manner. If the transporting vehicle does not have front lights, additional floodlights can be mounted on either side of tank 26 at its upper front edge to give forward illumination.

Figure 6:
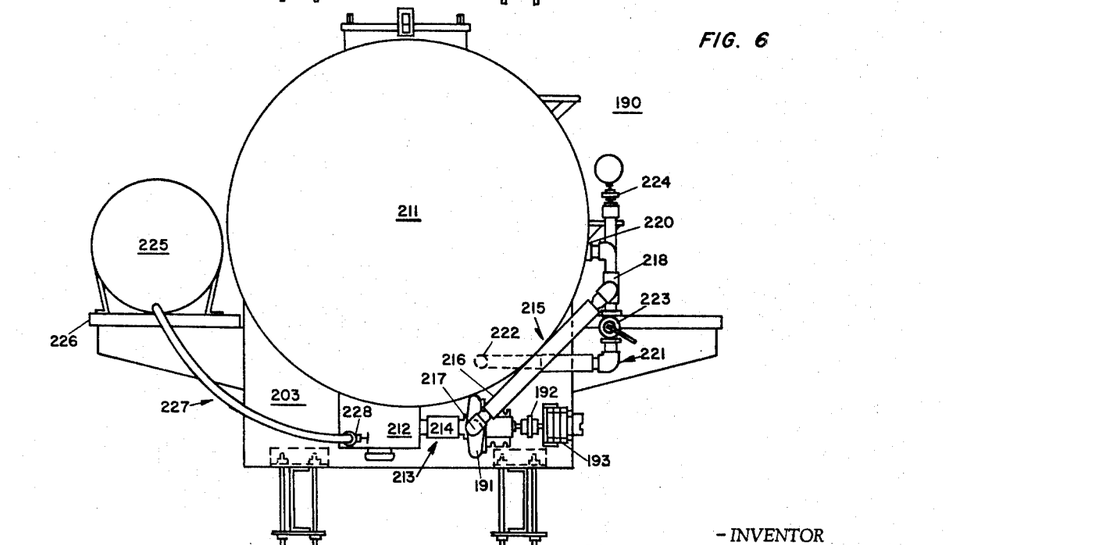
FIGURE 6 represents a view similar to FIGURE 2 but of a modified form of my invention.
Figure 7:
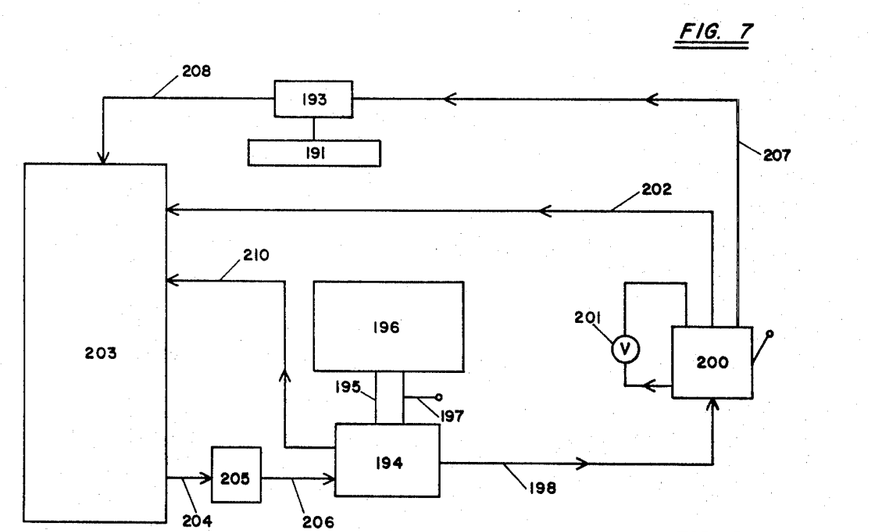
FIGURE 7 is a diagrammatic representation of the hydraulic system of the modified form of my invention.

An alternate form of the vehicular mounted slurry applicator is shown in FIGURES 6 and 7. The applicator 190 is similar in many respects to the applicator 10 and it is to be understood that except as detailed here the applicator 194 in its preferred form is of substantially the same construction as the applicator 10. Those parts of the applicator 190 that are similar to the parts of applicator 10 previously discussed are not discussed again except insofar as necessary to understand the differences between the two applicators.

The applicator 190 has a centrifugal pump 191 which is a reversible straight centrifugal pump, identical to the one in the applicator 10. The pump 191 is driven through a flexible linkage member 192 which is identical to the flexible linkage member 61. However, the pump 191 is driven through the flexible linkage member 192 by a hydraulic motor 193 rather than by a gasoline engine. The hydraulic motor 193 is driven by a hydraulic pump 194 (FIGURE 7) which is powered by a power takeoff 195 from the conveying vehicles transmision 196. Immediately after the slurry fertilizer has been loaded into the applicator 190 the conveying vehicles power takeoff is engaged with the hydraulic pump 194 by manipulating lever 197. The hydraulic pump forces the hydraulic fluid through the hydraulic line 198 to a valve unit 200 where a bypass valve 201 is positioned in an open position to permit the fluid to flow through line 202 to the fluid reservoir 203. The hydraulic fluid flows from the reservoir 203 through line 204, filter 205 and line 206 back to the hydraulic pump 194. When it is desired to drive the hydraulic motor 193 and begin the operation of the pump 191 the valve 201 is switched to the hydraulic pump position and the hydraulic fluid flows through the line 207 to the hydraulic motor 193 which drives the centrifugal pump 191. The hydraulic fluid flows through the hydraulic motor and then out through line 208 into the reservoir 203. From the reservoir it is returned to the hydraulic pump 194 through line 204, filter 205 and line 206. The excess flow of hydraulic fluid passes directly from the hydraulic pump 194 through line 210 to the reservoir 203.

Looking once again in FIGURE 6, it may seen that the hydraulic fluid reservoir 203 is the inside of the skid. The reservoir skid 203 is constructed in the same manner as skid 20 of applicator 10. In the preferred embodiment of the hydraulic arrangement shown diagrammatically in FIGURE 7 the system contains 20 gallons of hydraulic fluid. Looking at FIGURE 6 it may be seen that skid 203 engages the slurry tank 211 behind the sump 212.

Continuing to look at FIGURE 6, it may be seen that the centrifugal pump 191 is connected to the sump 212 through supply conduit 213 which has a hose section 214. The delivery conduit 215 has a 2½ inch hose section 216 connecting the pump outlet 217 to the cross 218. The cross 218 is supported through its connection to support socket 220 which is welded directly to the side of the slurry tank 211. Sparger conduit 221 connects the delivery conduit 215 to the sparger line 222 through the side wall of the slurry tank 211. Valve 223 regulates the ratio of the slurry delivered by the pump 191 going to the sparger line 222 and to the distribution section (not shown). An on-off valve like the on-off ratchet valve 81 in the applicator 10 cuts the slurry flow to the distribution section on and off. Gage 224 enables tthe adjustment of the pressure to provide the slurry delivery rate desired. The water tank 225 is mounted on catwalk 226 and has a flushing conduit 227 leading into the sump 212. Valve 228 is provided in the flushing conduit to control the flow of flushing water from the tank 225 to the sump 212.

In operation the slurry applicator 10 shown in FIGURE 1 is filled with an appropriate slurry fertilizer (not shown) through the manhole 36. The manhole 36 is then closed and latched so that the slurry will not slosh out of the slurry tank 26 as the vehicle, or truck in FIGURE 1, is driven to the field and across the field during a spreading operation. Immediately after the slurry fertilizer has been loaded into the applicator 10, the gasoline engine 56 is started and the slurry is circulated through the sparger system. The valve 81 is, of course, closed. The vent pipe 37 prevents pressure from building up in the tank.

When the applicator 10 reaches the field over which the slurry fertilizer is to be spread the operator adjusts valve 166 until he obtains the desired reading on the gage 93. Tables I and II give the gage readings that will provide the given spreading rates in pounds per acre when the applicator 10 is propelled across the field at the indicated speeds and with a typical slurry fertilizer with the two boom nozzles in operation. Table I applies when two nozzles, each of which has a capacity of approximately 10.8 gallons per minute, are used and Table II applies when two nozzles each having a capacity of 21.0 gallons per minute, are used. Other tables can be prepared in the usual ways of checking the rates of delivery for other combinations of nozzles. As previously explained, the applicator 10 can be operated with a single central nozzle or with three nozzles as well as with two boom nozzles in operation.

The pressure drops about 2 p.s.i.g. (pounds per square inch, gauge) when valve 81 is opened to begin the spreading operation. Tables I and II are adjusted so that the valve 166 is set to the indicated pressure before the valve 81 is opened.

If the operator wishes to stop the flow of slurry fertilizer at the end of each pass through the field while he makes his turn he pulls the lanyard 98 once which stops the flow and then after making the turn he pulls the lanyard once again to start the slurry flow after he has begun his next pass through the field.

Various well known patterns of spreading are used to distribute fertilizer on crop land depending upon the crop and the time in the crop's production at which the fertilizer is applied. One common procedure is to make passes back and forth through the field and then go around the outside of the field and seal the outer margins with an application.

When the applicator 10 runs out of slurry the pressure will drop to zero on the gage 93. The operator who keeps an eye on the gage through a rear view mirror (not shown) immediately stops the truck when he sees the pressure fail. He dismounts from the truck and opens valve 177 to admit the flushing water into the pump inlet. The pump 59 distributes the water throughout the entire plumbing system through which the slurry was pumped and through the sparger holes 50 into the bottom 51 of the tank 26, flushing out all of the plumbing and the bottom of the tank. It has been found to be advisable to use substantially the entire 30 gallons of water and to refill the water tank every time slurry is loaded into the slurry tank 26. Generally, the sump drain 42 is cleaned out every 3–5 trips if they occur on the same day. When the pressure again drops to zero indicating to the operator that substantially all the water has drained out of the water tank the operator shuts off the gasoline engine 56, and then closes valve 177. The two booms 116 and 117 are raised and secured in their travel position, assuming they were used, and the operator is ready to return to the plant or storage facility for another load of slurry fertilizer.

Looking at FIGURE 5 it can be seen that the center

TABLE I.—SPREADING CHART FOR TWO 10.9 GAL./MIN. WATER RATED NOZZLES (APPROXIMATELY SAME FOR SLURRY)

[Spreading Rate, Lbs./Acre]

| Gage Pressure, p.s.i.g. | Swath Width, feet | Miles/Hour | | | | | | | | | | | | | |
|---|---|---|---|---|---|---|---|---|---|---|---|---|---|---|---|
| | | 3 | 3½ | 4 | 4½ | 5 | 5½ | 6 | 6½ | 7 | 7½ | 8 | 8½ | 9 | 9½ | 10 |
| 16 | 30 | 1,144 | 980 | 851 | 762 | 686 | 624 | 572 | 528 | 490 | 457 | 429 | 404 | 381 | 361 | 343 |
| 18 | 31 | 1,241 | 1,063 | 931 | 827 | 744 | 677 | 620 | 573 | 532 | 496 | 465 | 438 | 414 | 392 | 372 |
| 20 | 32 | 1,283 | 1,099 | 962 | 855 | 770 | 700 | 641 | 592 | 550 | 513 | 481 | 453 | 428 | 405 | 385 |
| 22 | 33 | 1,318 | 1,130 | 989 | 879 | 791 | 719 | 659 | 608 | 565 | 527 | 494 | 465 | 439 | 416 | 395 |

TABLE II.—SPREADING CHART FOR TWO 21.0 GAL./MIN. WATER RATED NOZZLES (APPROXIMATELY SAME FOR SLURRY)

[Spreading Rate, Lbs./Acre]

| Gage Pressure, p.s.i.g. | Swath Width, feet | Miles/Hour | | | | | | | | | | | | | |
|---|---|---|---|---|---|---|---|---|---|---|---|---|---|---|---|
| | | 3 | 3½ | 4 | 4½ | 5 | 5½ | 6 | 6½ | 7 | 7½ | 8 | 8½ | 9 | 9½ | 10 |
| 18 | 31 | 2,302 | 1,973 | 1,726 | 1,535 | 1,381 | 1,256 | 1,151 | 1,062 | 987 | 921 | 863 | 812 | 767 | 727 | 691 |
| 20 | 32 | 2,354 | 2,018 | 1,766 | 1,570 | 1,413 | 1,284 | 1,177 | 1,087 | 1,009 | 942 | 886 | 831 | 785 | 744 | 706 |
| 22 | 33 | 2,404 | 2,060 | 1,803 | 1,603 | 1,442 | 1,311 | 1,202 | 1,109 | 1,030 | 962 | 901 | 848 | 801 | 759 | 721 |

The speed at which the vehicle will traverse the field is usually determined by the roughness of the field and the driver's skill in manipulating the vehicle at various speeds over uneven ground. The practice to date has been to drive the applicator mounted on a truck at an average speed of 6–8 miles per hour on fields having a gentle, furrowed surface.

After the valve 166 has been adjusted and the booms 116 and 117 have been lowered, if the spray nozzles 128 and 129 are to be used, the operator mounts the truck and begins to drive the truck through the field. When he is in the field he pulls the lanyard 98 opening valve 81 and delivering slurry fertilizer to the distributing section 17.

nozzle 151 is higher than the boom nozzle 137. When boom 116 is down in its operating position nozzle 136 is on a level with nozzle 137 and below nozzle 151. The center nozzle 151 is mounted straight upright and points straight back. The two boom nozzles are tilted downwardly so that they point down slightly when the booms 116 and 117 are in their operating position. Thus, even though all three nozzles are identical the center nozzle will have a spreading width of approximtaely 32 feet and the two boom nozzles will also have a combined width of approximately 32 feet. When the center nozzle is operated as a single nozzle mounted on mounting member 142 it is tilted back slightly so that it will have approximately a 32 foot spreading swath. It can thus be seen that the width of the swath can be adjusted by raising or lowering the nozzles with respect to the ground and by tilting the nozzles. By arranging the nozzles in the described manner they are adjusted to spread a swath approximately 32 feet wide when all three nozzles are operated toegther, when the two boom nozzles are operated together and when the central nozzle is operated by itself.

The amount of slurry dispensed can be increased or decreased from that given in Tables I and II by increasing or decreasing the number of nozzles in operation while holding the other conditions constant. The rate will be decreased approximately 50% when the applicator 10 is operated on only one nozlze and the rate is increased approximately 50% when the applicator 10 is operated on all three nozzles. The operation of the applicator 10 is the same no matter how many nozzles it is spreading with.

The operation of the alternate unitary slurry spray applicator 190 is substantially the same as the operation of the applicator 10 except that rather than starting a gasoline engine to drive the slurry pump the operator engages the power take off 195 from the transmission 196 with the hydraulic pump 194 and then switches the hand operated bypass valve 201 from the bypass position to the hydrualic motor operating position to drive the slurry pump. At the end of the spreading operation after the driver has flushed out the plumbing he switches the valve 201 to the bypass position and disengages the power takeoff 195 from its engagement with the hydraulic pump 194 to stop the operation of the slurry pump 191.

The slurry applicator 10 is an effective night applicator unit. The applicator 10 is equipped with floodlights 184 and 185. If the vehicle upon which the applicator 10 is mounted does not have front lights additional lights may be added so that a path in front of the applicator will be illuminated as well as the areas behind the applicator.

A special technique has been developed for spreading slurry fertilizer at night using an applicator such as the applicator 10. The applicator is driven to the field and with its lights on and the adjustments previously discussed with respect to the daytime operation of applicator 10 are made. When the applicator 10 is mounted on a truck having headlights, the floodlights 184 and 185 on the applicator have been found to give sufficient illumination, when operated with the headlights, to enable the operator to inspect the gages and make the necessary manipulations to place the applicator in operation.

The path of the first pass over the field is laid out and marked with lime or some other easily visible mark. This is preferably done during daylight but can be done at night. This path should start the truck on a spreading pattern that will avoid obstacles such as ditches.

After the path of the first run through the field has been marked and the applicator has been prepared for spreading operation, the vehicle begins spreading following the line mark on its first pass through the field. Slurry fertilizers generally leave a swath of light spatters corresponding to the areas covered. Usually, if the first path is laid out properly, the spreading operation can be continued by following the visible swath of the first pass and each succeeding swath on subsequent passes through the field until the spreading operation is complete. The swath stands out clearly when the applicator's light strike them.

It has also been found that slurry fertilizers usually have a luminescent characteristic at night for a time after they are spread. Therefore, the field can be visually inspected from a distance without using lights to determine if any areas were missed. This inspection can be made while the applicator is still working in the field in the same manner that such an inspection can be made in the daytime. The ability to make such an inspection is particularly important at night when, even with a starting lime mark and the floodlighting of the areas behind the vehicle, skips can be made on occasion even when reasonable care is exercised.

If a slurry fertilizer were to be used that did not leave splatters that contrast with the color of the soil being fertilized and that did not have a luminescent affect, then a dye material or a luminescent dye material could be added to the slurry so that the operation could be carried out at night. Of course, a marking material other than lime could be used to lay out the route of the first pass through the field. In some situations it might be possible to dispense with the marked route through the field altogether and guide by existing features already present in the field. It is to be understood that the hydraulically powered applicator 190 may be equipped with floodlights in the same manner as the applicator 10 and that the night application technique described above would then be equally applicable to the applicator 190.

It will now be understood that the new and improved slurry applicator of the present invention readily lends itself to the handling of slurry fertilizers having a high solids content that have a tendency to form sludge and scale in applicator tanks and plumbing systems. This applicator resists the disabling action of coarse particles, such as sand, that scour and erode metals and other materials over which they flow, particularly at points of relatively high flow velocities and turbulence. Fertilizer slurries are also corrosive at times and so the applicator cannot be highly sensitive to somewhat acid slurries. Neither can the applicator be highly sensitive to alkaline slurries for slurry fertilizers are sometimes alkaline.

While the applicator of this invention is not made of special materials that would resist being damaged by various pH's, it has proven to be relatively insensitive when used for spreading fertilizers having a wide range of pH's. The storage tank is made of mild steel, the pipes of carbon steel and the hoses are rubber with cord or wire reinforcing.

The applicator of this invention has shown itself adaptable in handling slurry fertilizers having widely varying chemical and physical properties and it is therefore able to handle a normal commercial stock of various formulations. This is very important because different crops and different soils require different fertilizer formulations and it would be extremely expensive to maintain different applicators for various groups of formulations.

The applicator of this invention is very rugged and provides low maintenance operation over rough terrains such as open farm fields and the roads leading to them. Each of the conduits has at least one flexible portion so that relatively violent impacts and vibrations can be repeatedly absorbed.

The applicator also lends itself to both day and night operation under a wide variety of weather conditions. The applicator can spread fertilizers substantially evenly when wind velocities are as high as 20 m.p.h. All of the above features have been obtained in an applicator that has a low maintenance requirement because of its ruggedness and simplicity. The applicator of this invention is also relatively inexpensive and easy to construct.

While in accordance with the patent statutes, I have described what at present is considered to be the preferred embodiment of this invention, it will be obvious to those skilled in the art that various changes and modifications may be made therein without departing from the present invention, and I, therefore, aim in the following claims to cover all such equivalent variations as fall within the true spirit and scope of this invention.

I claim:

1. A universal unitary slurry spray applicator for mounting upon a vehicle comprising at least a pair of skids; a slurry tank mounted on said skids; a centrifugal pump mounted on said skids; said pump having a mechanical seal with resilient parts and an impeller with back vanes and pump holes to circulate slurry on both sides of said impeller and around the resilient parts of said mechanical seal; said slurry tank having a sump; a supply conduit connecting said sump to said pump; at least a section of said supply conduit being hose; a delivery conduit extending from the outlet of said pump; said delivery conduit including a pressure gage, an on-off ratchet valve, being over 50% hose, at least one T connection in which a channel is sealed off in direct line with the direction of the incoming slurry so that the slurry can build its own elbow and not erode the connection to the extent it would erode a conventional elbow connection, and terminating in a hose; a sparger line extending the entire length of said slurry tank; a sparger connecting conduit connecting the sparger line and the delivery conduit; said sparger line having a plurality of linearly arranged sparger holes about $7/_{16}$ inch in diameter and about 15 inches from center to center; a valve in the sparger connecting conduit that has a a continuous adjustment ranging from full-on to full-off; at least one section of said sparger connecting conduit being hose; a nozzle mounting unit; two mounting members mounted on said skids and extending generally perpendicularly; said members including a plurality of matching positioning means for mounting said nozzle mounting unit at various heights above the ground; two booms mounted on said nozzle mounting unit; said booms pivoting between positions extending substantially beyond opposite sides of said skids and positions that are not substantially beyond the sides of said skids; a nozzle mounted at the outer end of each of said booms; a cross connection; said cross connection having three open channels and a closed channel; said closed channel connected to a central portion of said nozzle mounting unit; a king nipple connected in each of said open channels; an elbow connected to said cross and having its channel opening upwardly from said connection; a central nozzle connected in said upwardly opening channel of said elbow and positioned between said booms; said nozzles being low impact, non-atomized spray nozzles that are free of internal obstructions and give wide flat spray patterns with uniform distribution; said delivery conduit being connectable to one of said king nipples; a hose connected to each of the other two king nipples and connected to a respective one of the boom nozzles; a separate connection for alternately mounting said centrally mounted nozzle; said separate connection having an inlet and an outlet; a king nipple connected in the inlet and the outlet having a plug; said plug and said central nozzle being interchangeable; the delivery conduit being transferable between, the king nipple in said cross and said king nipple in the separate connection whereby the three nozzles can be operated in the following three combinations, all three at once, the two boom nozzles together and the central nozzle by itself without the need of valve means; a water tank mounted on said skids; a conduit connecting said water tank to the inlet of said pump; and a valve in said conduit to cut on said water to flush out said supply, delivery and sparger conduits, said sparger line, said nozzles and said pump when the slurry tank has been emptied.

2. The unitary vehicular mounted slurry spray applicator of claim 1 wherein at least one flood light is mounted on said skids to adapt said applicator for superior night usage.

3. The unitary slurry spray applicator of claim 1 in which a gasoline engine is mounted on said skids and connected through a flexible coupling to operate said pump.

4. The unitary slurry spray applicator of claim 1 in which a hydraulic motor is mounted on said skids, a flexible coupling connects said hydraulic motor to said pump, said hydraulic motor operably connectable to a hydraulic pump powered by the engine of the vehicle that transports said unitary slurry spray applicator.

5. A universal unitary slurry spray applicator for mounting upon a vehicle comprising at least a pair of skids; a slurry tank mounted on said skids; a pump and a supply conduit; said supply conduit connecting said pump to said slurry tank; at least a section of said supply conduit being hose; a delivery conduit extending from the outlet of said pump; at least one section of said delivery conduit being hose; a sparger line extending substantially the entire length of said tank; a sparger conduit connecting the sparger line to said pump; said sparger line having a plurality of linearly arranged sparger holes about $7/_{16}$ inches in diameter; valve means for adjusting the ratio of slurry pumped by said pump delivered to the outer end of said delivery conduit and delivered to said sparger inch in diameer; valve means for adjusting the ratio of a spreading nozzle mounting unit mounted on said skids; and at least one spreading nozzle mounted on said spreading nozzle mounting unit; said spreading nozzle and said delivery conduit being connected.

6. A universal unitary slurry spray applicator for mounting upon a vehicle comprising at least a pair of skids; a slurry tank mounted on said skids; a centrifugal pump mounted on said skids; said pump having a mechanical seal with resilient parts and an impeller with back vanes and pump holes to circulate slurry on both sides of said impeller and around the resilient parts of said mechanical seal; said slurry tank having a sump; a supply conduit connecting said sump to said pump; a delivery conduit extending from the outlet of said pump; said delivery conduit including a pressure gage, an on-off ratchet valve, and at least one T connection in which a channel is sealed off in direct line with the direction of the incoming slurry so that the slurry can build its own elbow and not erode the connection to the extent it would erode a conventional elbow connection, and at least one spreading nozzle mounted on said skids and connected to said delivery conduit.

7. A slurry fertilizer spray apparatus comprising a nozzle mountng unit; two booms mounted on said nozzle mounting unit; a nozzle mounted at the outer end of each of said booms; a cross connection; said cross connection having three open channels and a closed channel; said closed channel connected to a central portion of said nozzle mounting unit; a tapped in connection connected to said cross and having an outwardly opening channel; a central nozzle connected in said outwardly opening channel and positioned between said booms; said delivery conduit being connectable to one of said channels; a hose connected to each of the other two channels and connected to a respective one of the boom nozzles; a separate connection for alternately mounting said centrally mounted nozzle; said separate connection having an inlet and an outlet; a plug in said outlet; said plug and said central nozzle being interchangeable; the delivery conduit being adapted for and transferable between the channel in said cross and said inlet in the separate connection whereby the three nozzles can be operated in the following three combinations; all three at once; the two boom nozzles together and the central nozzle by itself without the need of valve means.

8. A spray applicator suitable for spreading slurry fertilizers comprising a slurry tank; a slurry pump connected to said slurry tank; said slurry tank having an outlet at one end; a supply conduit connecting said outlet to said pump; at least a section of said supply conduit being hose; a sparger line extending the entire length of said slurry tank; a sparger connecting conduit connecting the sparger line to said pump; said sparger line having a plurality of linearly arranged sparger holes about $7/_{16}$ inch in diameter; at least one section of said sparger connecting conduit being hose; two booms mounted on said slurry tank; said booms pivoting between positions extending substantially beyond opposite sides of said slurry tank and positions that are not substantially beyond the sides of said slurry tank; a nozzle mounted at the outer end of each of said booms; said nozzles being low impact non-atomized spray nozzles that are free of internal obstructions; means connecting said two boom mounted nozzles with said pump; said means including at least one sealed off channel at an elbow turn in its flow path; said sealed off channel being in line with the flow path whereby the slurry will be caused to build up and form its own elbow and not erode the means connecting said two boom mounted nozzles with said pump at said elbow turn if the sealed off channel were not present at the elbow turn; a water tank mounted on said slurry tank; a conduit connecting said water tank to the inlet of said pump; and a valve in said conduit to cut on the water to flush out said supply, delivery and sparger conduits, said sparger line, said nozzles and said pump when the slurry tank has been emptied.

9. A hydraulic operated universal unitary slurry spray applicator for mounting upon a vehicle comprising a slurry tank, at least one skid for mounting said slurry tank on the vehicle, said skid being fluid-tight, a slurry pump mounted on said skid and connected to said slurry tank, a hydraulic motor mounted on said skid, a flexible coupling connecting said hydraulic motor to said pump, said hydraulic motor operably connectable to a hydraulic pump powered by a power takeoff on the vehicle that transports said universal unitary slurry spray applicator, and said skid serving as the hydraulic fluid reservoir.

References Cited

UNITED STATES PATENTS 3,143,295   8/1964   Booker ___________ 239—142

EVERETT W. KIRBY, *Primary Examiner.*

UNITED STATES PATENT OFFICE
CERTIFICATE OF CORRECTION

Patent No. 3,386,660

June 4, 1968

Robert R. Marriam

It is certified that error appears in the above identified patent and that said Letters Patent are hereby corrected as shown below:

Column 14, line 12, "inch in dimeer; valve means for adjusting ratio of" should read -- line when the universal slurry spray applicator is in use; --.

Signed and sealed this 21st day of October 1969.

(SEAL)
Attest:

Edward M. Fletcher, Jr.
Attesting Officer

WILLIAM E. SCHUYLER, JR.
Commissioner of Patents